United States Patent
L'Heureux (10) Patent No.: US 9,430,853 B2
(45) Date of Patent: Aug. 30, 2016

(54) METHODS FOR REIFYING IMAGES TO CONVEY NON-TEXTUAL INFORMATION TO VIEWERS

(71) Applicant: Lawrance Joseph L'Heureux, San Marcos, CA (US)

(72) Inventor: Lawrance Joseph L'Heureux, San Marcos, CA (US)

(73) Assignee: Lawrance Joseph L'Heureux, San Marcos, CA (US)

( * ) Notice: Subject to any disclaimer, the term of this patent is extended or adjusted under 35 U.S.C. 154(b) by 0 days.

(21) Appl. No.: 14/593,850

(22) Filed: Jan. 9, 2015

(65) Prior Publication Data
US 2016/0203616 A1    Jul. 14, 2016

(51) Int. Cl.
G06T 11/00    (2006.01)
G06T 11/60    (2006.01)

(52) U.S. Cl.
CPC .............. G06T 11/001 (2013.01); G06T 11/60 (2013.01)

(58) Field of Classification Search
CPC ........................... G09G 5/02; G06F 2203/011
See application file for complete search history.

(56) References Cited

U.S. PATENT DOCUMENTS

| 8,363,063 B2 * | 1/2013 | Ou | .................. B44D 3/003 345/589 |
|---|---|---|---|
| 2010/0201704 A1 | 8/2010 | Jang et al. | |
| 2011/0274348 A1 | 11/2011 | Oicherman et al. | |

FOREIGN PATENT DOCUMENTS

WO    03069894    8/2003

OTHER PUBLICATIONS

"Bodily maps of emotions" Lauri Nummenmaa, Enrico Glerean, Riitta Hari and Jari K. Hietanen PNAS 2014 111 (2) 646-651; Social Sciences—Psychological and Cognitive Sciences. published ahead of print Dec. 30, 2013, doi:10.1073/pnas.1321664111.*
"emBODY tool" version 1. Nummenmaa L., Glerean E., Hari R., Hietanen, J.K. (2013). Bodily maps of emotions, Proceedings of the National Academy of Sciences of United States of America doi:10.1073/pnas.1321664111. Screenshot from working example. Code obtained from https://git.becs.aalto.fi/eglerean/embody/tree/7848f712b8361fa1a9b4032e3b1ab93fa9ad8.*
"Mood Tagging"—Anna Carey. CHI'13, Apr. 27-May 2, 2013, Paris, France. Copyright 2013. https://courses.ischool.berkeley.edu/i262/f14/sites/default/files/student_uploads/Mood%20Tagging%20Writeup.pdf. Feb. 23, 2016.*
http://animationguides.com/character-emotion-in-animation, p. 1, Jan. 9, 2015.
http://iml.jou.ufl.edu/projects/Fall05/rosenblatt/intro.html, p. 1, Jan. 9, 2015.
http://psychiclibrary.com/beyondBooks/aura-colors-and-meanings, p. 1, Jan. 9, 2015.

* cited by examiner

*Primary Examiner* — Antonio A Caschera
(74) *Attorney, Agent, or Firm* — Michael K. Kelly; Jennings Strouss & Salmon, PLC (57) ABSTRACT

An interactive computer program for augmenting an image to include reified emotion information. The program implements the steps of: displaying an unreified image; prompting a user to identify an emotion associated with the image; prompting the user to select a color corresponding to the identified emotion; prompting the user to select a location within the image for applying the selected color; applying the selected color to the selected location within the image; and displaying the reified image.

20 Claims, 9 Drawing Sheets

TABLE 1

Color Chart Grid

METHODS FOR REIFYING IMAGES TO CONVEY NON-TEXTUAL INFORMATION TO VIEWERS

The present invention relates, generally, to the artificial enhancement of still and moving images through the addition of predetermined colors at targeted locations associated with human beings within the image and, more particularly, to an interactive computer program for instructing a technician in mapping colors to emotions in the reification process.

BACKGROUND

Reification involves the concretization of that which is intrinsically abstract. For example, weather forecasters superimpose color graphics over land maps to depict rain, sunshine, and other weather related attributes without using written text. In addition, thought bubbles are often used in comics and animation to convey (concretize) abstract thoughts, feelings, and emotions. The chain thought bubble, the universal symbol for conveying emotion in cartoons, consists of a cloud-like or elliptical bubble containing a textually expressed thought, with a chain of increasingly smaller bubbles leading to the individual to whom the emotion is attributed. Thought bubbles may also be used in circumstances when a human character is unable to speak. Although thought bubbles may contain language-independent expletives such as ["!*Λ##!], they typically rely on written text to convey information to the viewer.

Emotion may also be conveyed or nuanced through various non-textual mechanisms including facial expression, body language, lighting, and music. (See, for example, http://animationguides.com/character-emotion-in-animation/). In television, on line, and billboard advertising, commercial marketers give products a certain image by carefully selecting colors for use on their packaging and presentation. (See http://iml.jou.ufl.edu/projects/Fall05/rosenblatt/intro.html).

In the metaphysical field of psychic readings, it is said that all living things are surrounded by an electromagnetic aura, often described as an oval shaped, colored band of sound, light, and/or vibration. The human aura is sometimes referred to as a psychic energy field, with each color representing a person's mood or condition of their chakras. Many psychic healers and empaths are believed to be sensitive to these auras; indeed, Kirlian cameras have been extensively used to record human auras. (See http://psychiclibrary.com/beyondBooks/aura-colors-and-meanings).

Presently known photographic and video-graphic techniques are not well adapted to conveying human emotions through non-verbal modalities. Systems and methods are thus needed which overcome these shortcomings.

BRIEF SUMMARY OF THE INVENTION

Various embodiments facilitate the reification of human emotions through the use of a digital matrix which maps a palate of colors to a palate of human emotions. An interactive computer program prompts the user to identify an emotion or combination of emotions pertaining to a still image or a series of frames within a moving image, and selectively applies a corresponding color or colors to targeted locations surrounding or otherwise associated with the actors in the image. As a result, the image is enhanced (reified) with a dimension of color which conveys underlying emotional and spiritual themes to the viewer in a language-independent manner.

BRIEF DESCRIPTION OF THE DRAWING FIGURES

The present invention will hereinafter be described in conjunction with the appended drawing figures, wherein like numerals denote like elements, and.

DETAILED DESCRIPTION OF PREFERRED EXEMPLARY EMBODIMENTS

The embodiments described herein generally relate to techniques for changing the visual appearance of an image to convey emotions through the use of colors, using a matrix which maps human emotions to corresponding colors. Various embodiments may also employ an interactive computer system including a program for prompting a technician to identify an emotion, select an appropriate color to convey the emotion, and one or more interactive tools for mapping the colors to particular locations and in desired contours onto the subjects within the image.

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

Those of skill in the art will appreciate that the various illustrative logical blocks, modules, and algorithm steps described in connection with the embodiments disclosed herein may be implemented as electronic hardware, computer software, or combinations of both. Some of the embodiments and implementations are described above in terms of functional and/or logical block components (or modules) and various processing steps. However, it should be appreciated that such block components (or modules) may be realized by any number of hardware, software, and/or firmware components configured to perform the specified functions.

To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

For example, an embodiment of a system or a component may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments described herein are merely exemplary implementations.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein.

A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. The word "exemplary" is used exclusively herein to mean "serving as an example, instance, or illustration." Any embodiment described herein as "exemplary" is not necessarily to be construed as preferred or advantageous over other embodiments.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

Figure 1:
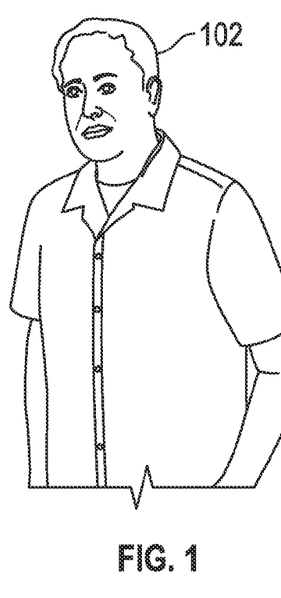
FIG. 1 is a screen shot of an image of a human subject without reification.

Referring now to FIG. 1, an image of a human subject 102 is shown without reification. The image thus has a limited ability to convey non-textual information. For example, the director may use lighting, music, filters, or textures to suggest a mood or to subtly convey emotion.

Figure 2:
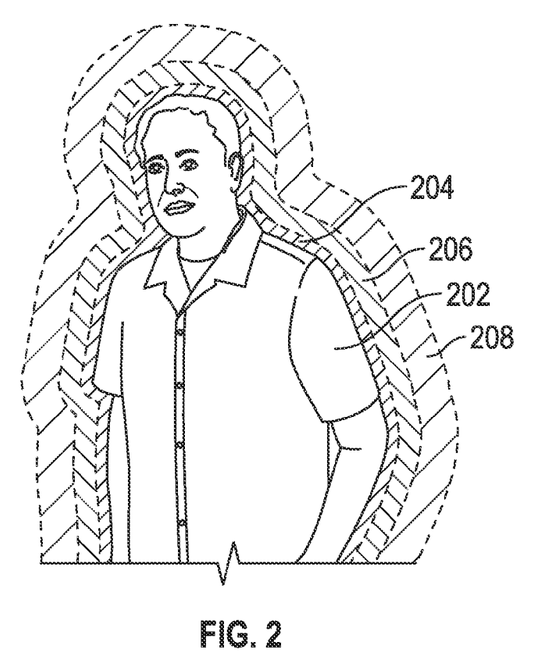
FIG. 2 is a screen shot of the human subject of FIG. 1, illustrating reified emotions superimposed as colors in accordance with various embodiments.

FIG. 2 is a screen shot of a person 202 (corresponding to the human subject of FIG. 1), illustrating reified emotions superimposed as colors. In particular, a first zone 204 closely surrounds the person much like a shroud; a second zone 206 and a third zone 208 may also be employed, as explained in greater detail below.

In an embodiment, the first zone 204 may correspond to the primary or dominant emotion desired to be conveyed to the viewer, whereas the second zone 206 may be used to convey a secondary or less dominant emotion. The third zone 208 may be used to convey more subtle emotional tones, if desired. In determining which colors to display in the various zones, the reifying technician may employ a three step protocol: i) determine the emotion to be conveyed; ii) select an appropriate color, for example, with reference to a pre-configured matrix which maps emotions to colors; and iii) determine the location and shape of the color relative to the person or people to whom the emotion is to be attributed.

Although the three zones shown in FIG. 2 are modeled as discrete regions, it should be appreciated that virtually any shape or location may be employed, and the transitions between zones may be gradual, blurred, continuous, discrete, or any type of visual transition as appropriate to effectively convey the emotion or combination of emotions associated with the image.

Figure 3:
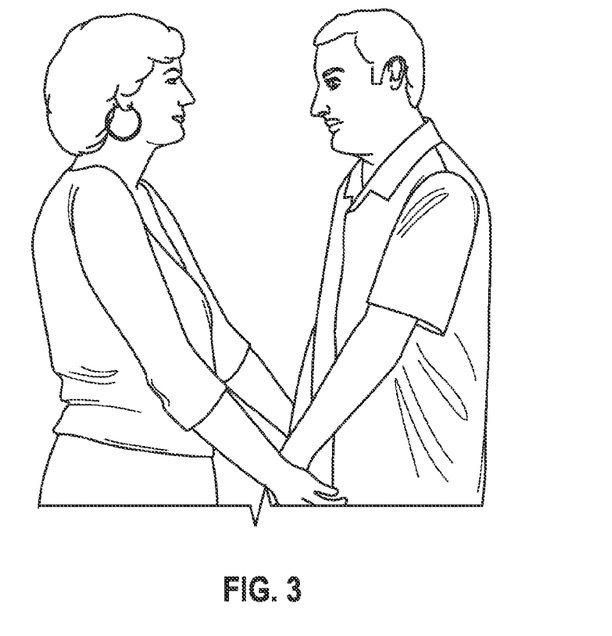
FIG. 3 is a screen shot of an image of two people interacting at a distance without reification.

FIG. 3 is a screen shot of an image of two people interacting without reification, at a distance which suggests some degree of emotional interaction. In this regard, it should be appreciated that each person may exhibit emotions which are independent of the other person, partially dependent on the presence of the other person, or substantially intertwined with the other person.

Figure 4:
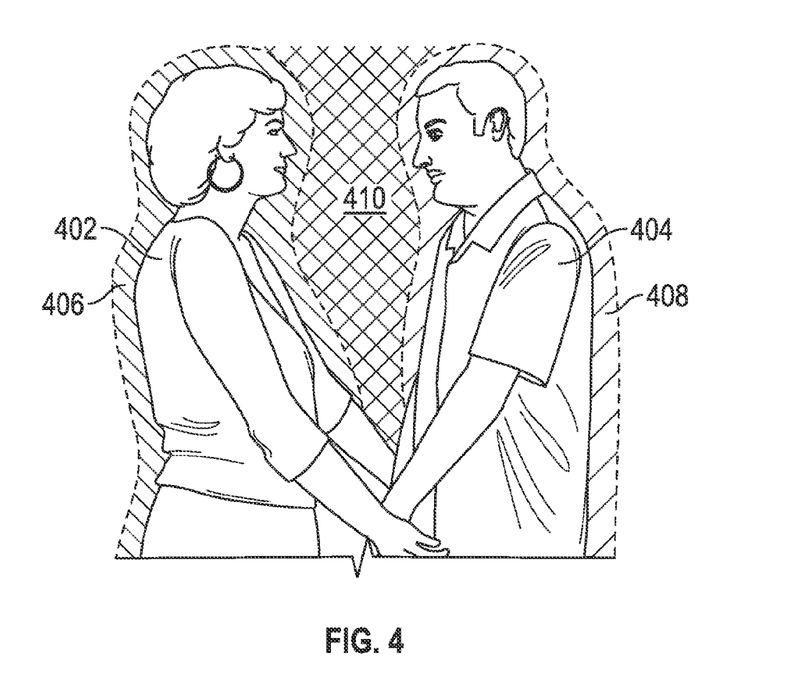
FIG. 4 is a screen shot of the people of FIG. 3, illustrating reified emotions influenced by the presence of the other person and superimposed as colors in accordance with various embodiments.

FIG. 4 is a screen shot of a woman 402 and a man 404 as shown in FIG. 3, illustrating reified emotions influenced by the presence of the other person and superimposed as colors. In the illustrated example, a first person exhibits one or more emotions expressed as color(s) (reified) within a first zone 406, and a second person exhibits one or more emotions expressed as color(s) (reified) within a second zone 408. A third zone 410 represents the energy and/or emotions shared between them.

Figure 5:
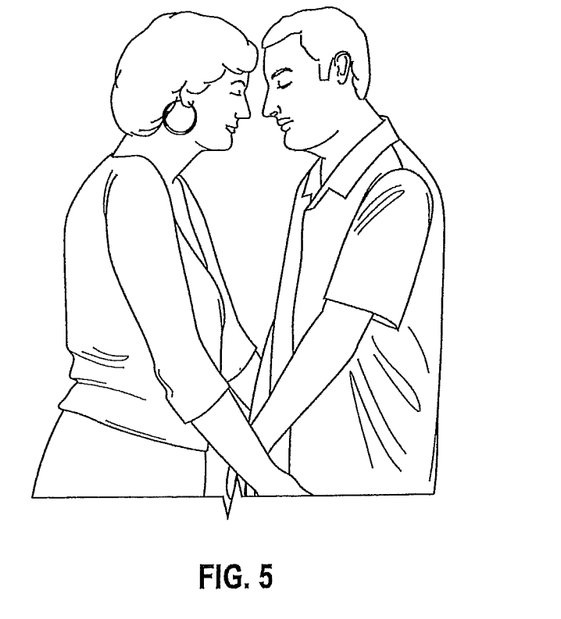
FIG. 5 is a screen shot of an image of the people of FIGS. 3 and 4 moving physically closer to each other without reification.
Figure 6:
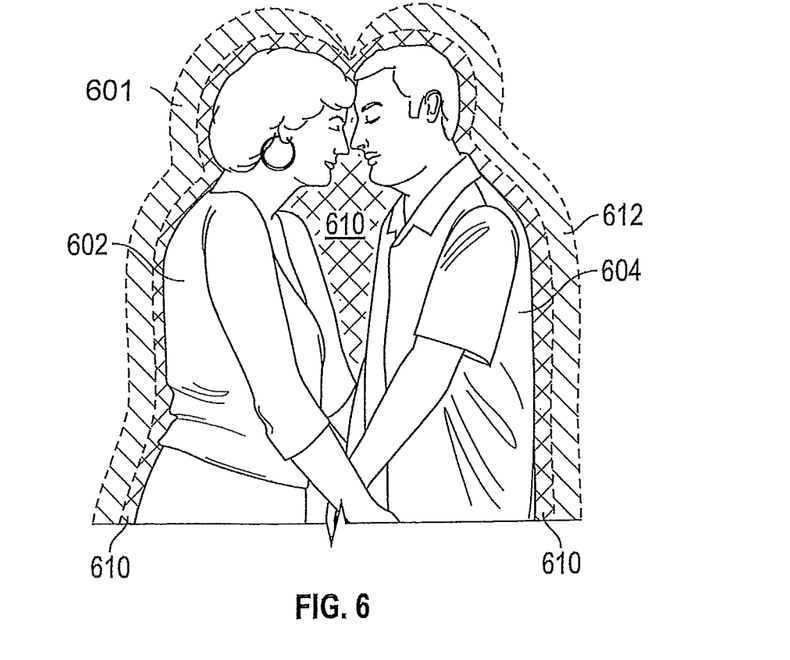
FIG. 6 is a screen shot of the people of FIG. 5, illustrating increased spiritual interaction superimposed as colors in accordance with various embodiments.

FIG. 5 is a screen shot of an image of the people of FIGS. 3 and 4, having moved physically closer to each other, without reification. FIG. 6 is a screen shot of the people of FIG. 5, illustrating increased spiritual interaction superimposed as colors. Thus, a shared zone 610 represents the energy shared, exchanged, or otherwise comingled between them, and generally fills the space between them and the space immediately surrounding the couple. To the extent one or both of them continues to exhibit one or more emotions independent of the shared emotion, the first person 602 may display a first zone 601, and the second person 604 may display a second zone 612. In this regard, the degree of shared energy (e.g., color, intensity, shape, and spatial extent) may generally indicate the degree of intimacy involved in the communication between people, regardless of the nature of the emotion (e.g., passion, fear, anxiety, exuberance, or the like).

Figure 7:
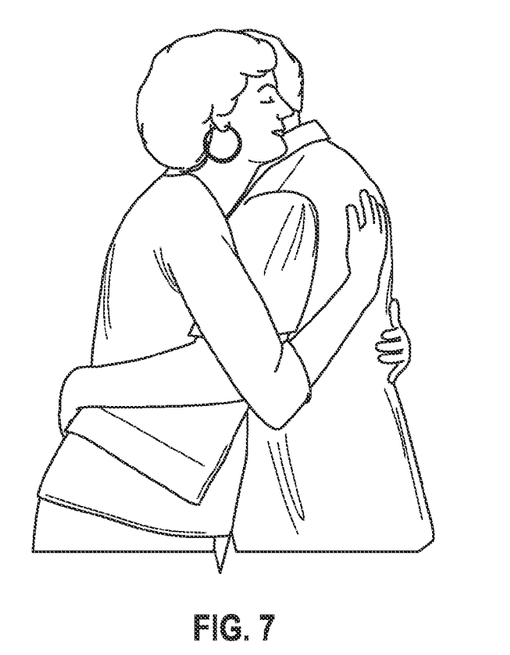
FIG. 7 is a screen shot of an image of the people in FIG. 6 embracing each other without reification.
Figure 8:
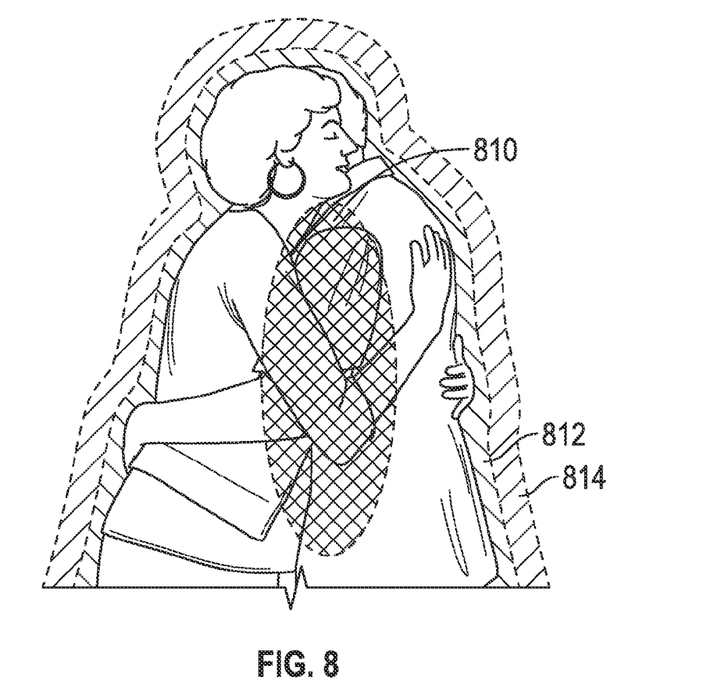
FIG. 8 is a screen shot of the people of FIG. 7, illustrating further increased spiritual interaction superimposed as colors in accordance with various embodiments.

FIG. 7 is a screen shot of an image of the people of FIG. 6 embracing each other without reification. FIG. 8 is a screen shot of the couple of FIG. 7, illustrating further increased spiritual interaction superimposed as colors in a first zone 810 which includes both common space occupied by both people, as well as the common perimeter 812 surrounding the couple. An outer zone 814 may be used to display secondary or complimentary emotions, if desired.

Figure 9:
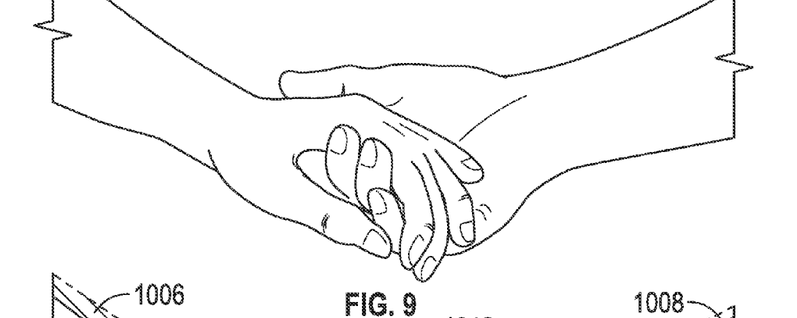
FIG. 9 is a screen shot of an image of two human hands clasping without reification.
Figure 10:
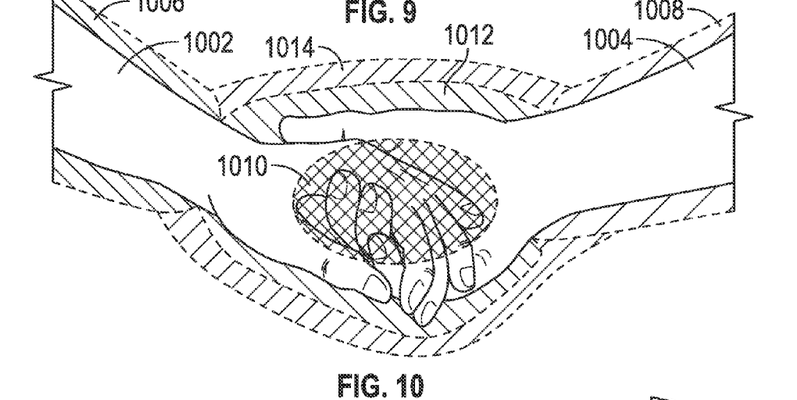
FIG. 10 is a screen shot of the clasping hands of FIG. 9, illustrating the exchanged energy as colors in accordance with various embodiments.

FIG. 9 is a screen shot of an image of two human hands clasping without reification. FIG. 10 is a screen shot of the clasping hands of FIG. 9, illustrating the exchanged energy as one or more colors. More particularly, a first forearm/hand 1002 is shown holding a second forearm/hand 1004. The first hand 1002 exhibits a first zone 1006, and the second hand 1004 exhibits a second zone 1008. the joined hands display a shared zone 1010 exhibiting strongly shared emotions, and secondary zones 1012 and 1014 exhibiting less dominant emotions. As described in greater detail below, the colors, hues, intensity, tones, and other attributes of the colors may be selected bases on one or more matrices which map emotions/feelings to various colors within a color palate.

Moreover, although the examples set forth herein depict human subjects, the invention is not so limited. For example, the reification techniques may be applied to any living organism such as animals and plants throughout the flora and fauna kingdoms. In addition, the reification of energy may be further applied to fields of any kind or nature such as, for example, gravitational or ionization fields acting on inanimate objects. Alternatively, the techniques described herein may be useful in conveying information about a scene independent of energy fields, including disembodied "emotions" such as bad memories or uplifting spiritual themes associated with a particular location or environment.

Figure 11:
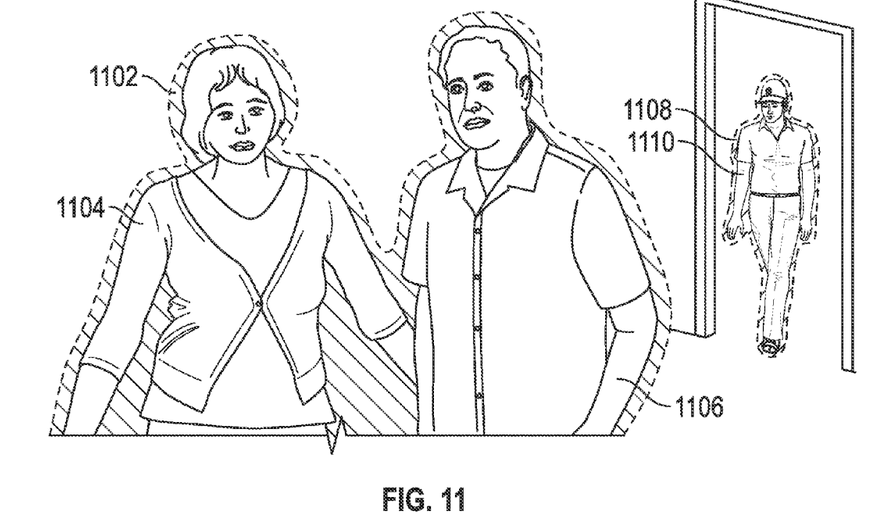
FIG. 11 is a screen shot of an image of two people interacting, and a third party affected by and/or affecting the spiritual interaction of the first two parties, illustrating the spiritual interaction as reified colors in accordance with various embodiments.
Figure 12:
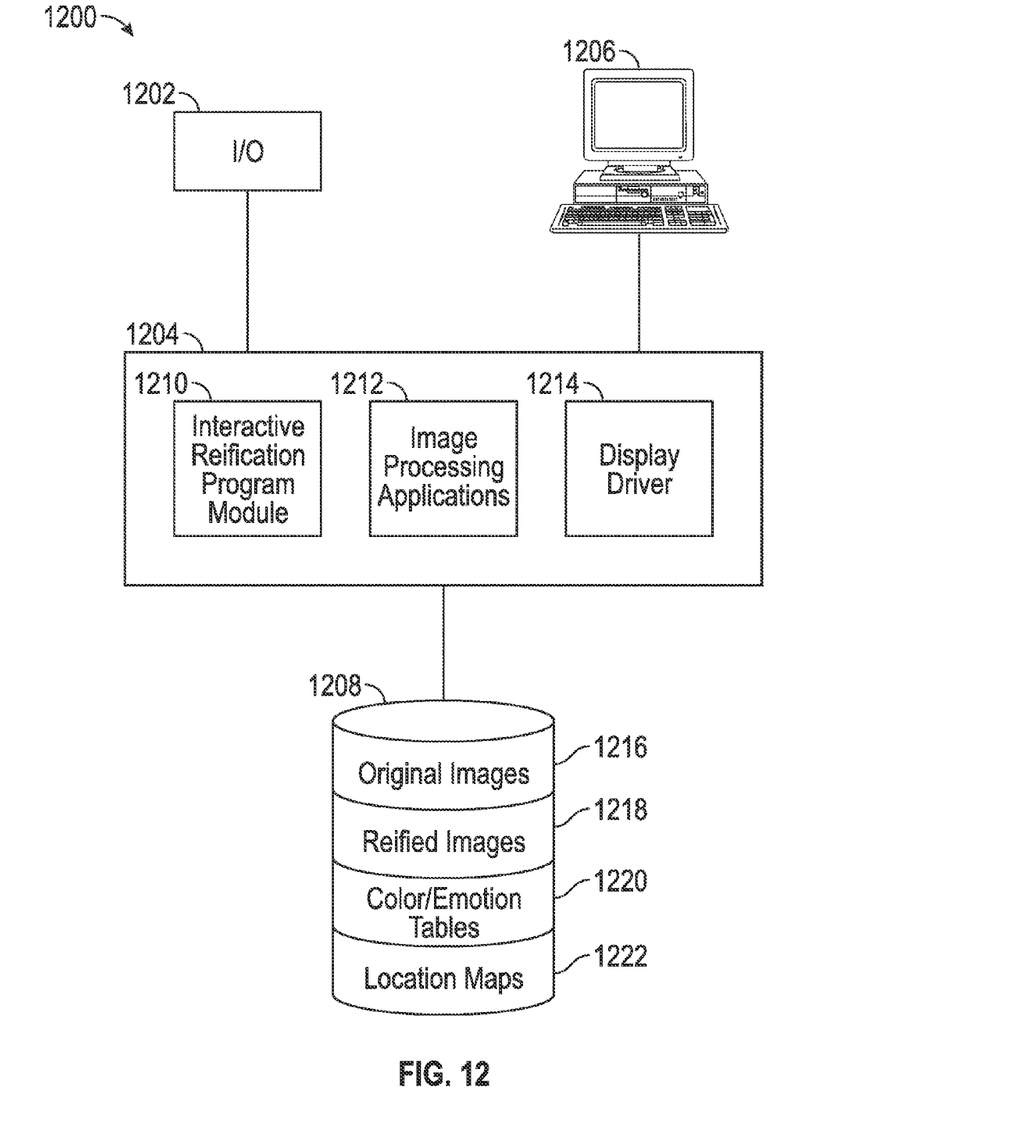
FIG. 12 is a schematic block diagram of an interactive system for reifying images in accordance with various embodiments.

FIG. 11 is a screen shot of an image of two people interacting with each other, along with a third party affected by and/or affecting the spiritual interaction of the first two parties. A first zone 1102 represents one or more colors associated with a first person 1104 and a second person 1106, either individually, combined, or both. A third zone 1108 represents the emotion of a third party 1110 who is influenced by and/or who influences the energy of the first two parties. By way of non-limiting example, the presence of the third party (or other entity or phenomena) may produce anxiety in one of the first two parties, which may be represented by a color or tinge proximate one party and superimposed on the color region shared between the first two parties. Conversely, one or both of the first two parties may influence the emotional state of the third party, as represented by the color(s) associated with zone 1108, FIG. 12 is a schematic block diagram of an interactive system 1200 for reifying images in accordance with various embodiments. More particularly, the system 1200 includes an input/output (I/O) module 1202, a processing module 1204, a display module 1206, and a memory module 1208. The I/O module 1202 includes any suitable hardware for interacting with the processing module 1204 and/or the display module 1206, such as, for example, a keyboard, touch pad, joy stick, microphone, mouse, and the like. The display module 1206 may be configured to display the unreified images, the reified images during processing, and/or the completed reified images. The processing module 1204 includes an interactive reification program module 1210 configured to implement the various methods and techniques described herein, a display driver module 1214, and an image processing module 1212 including photo and video editing software such as, for example, the CS6 family of editors available from Adobe Systems at www.adobe.com/products.

The memory module 1208 includes a first data structure 1216 for storing and retrieving unreified images, a second data structure 1218 for storing and retrieving reified images, a third data structure 1220 for storing color/emotion maps, tables, matrices, and the like, and a fourth data structure 1222 for storing position maps for targeting particular locations on or near images of people, places, and things.

Figure 13:
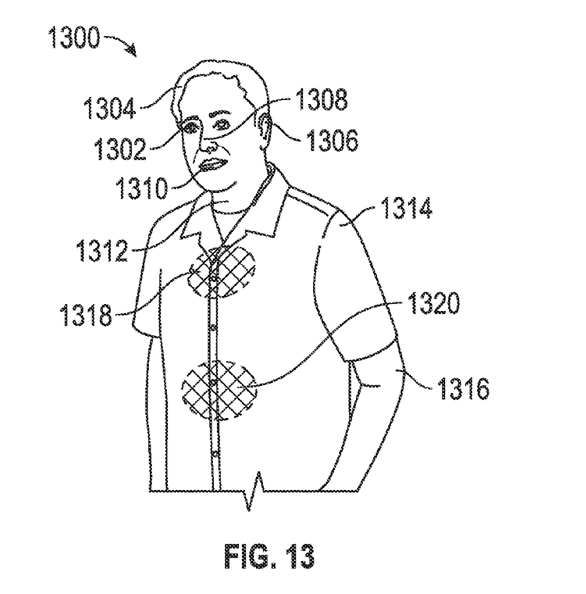
FIG. 13 is schematic mapping diagram useful for targeting traditionally physical attributes to a subject in accordance with various embodiments.

FIG. 13 is schematic mapping diagram 1300 useful for targeting traditionally physical attributes (e.g., pain, inflammation, tingling, numbness, irritation, sight, smell, hearing, nausea, speech, toothache, headache, and the "choked up" feeling) to human subjects, generally corresponding to the contents of data structure 1222.

More particularly, the interactive reification program may be configured to present the diagram 1300 to a reification technician on display module 1206, and to prompt the technician to select one or more locations for displaying intuitively physical attributes which tend to manifest locally, such as in the following locations: eyes 1302; head 1304; ears 1306; nose 1308; mouth 1310; throat 1312; shoulder 1314; elbow 1316; heart 1318; stomach 1320, and any other location, region, or body part.

Figure 14:
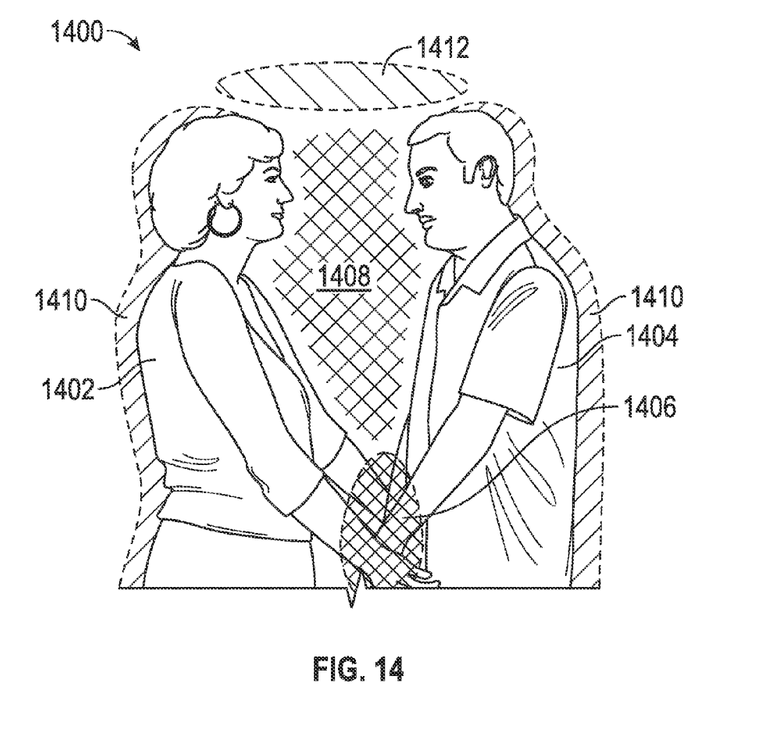
FIG. 14 is a schematic mapping diagram useful for targeting traditionally spiritual attributes to subjects in accordance with various embodiments.

FIG. 14 is a schematic mapping diagram 1400 useful for targeting traditionally spiritual attributes to human subjects in accordance with various embodiments. More particularly, the interactive reification program may be configured to present diagram 1400 to a reification technician on display module 1206, and to prompt the technician to select one or more locations or zones for displaying emotions. The user selectable zones may include any of the aforementioned zones discussed above, as well as a first zone 1410 associated with a first person 1402, a second zone 1410 associated with a second person 1404, and/or various shared zones 1406, 1408, 1410, and 1412.

Figure 16:
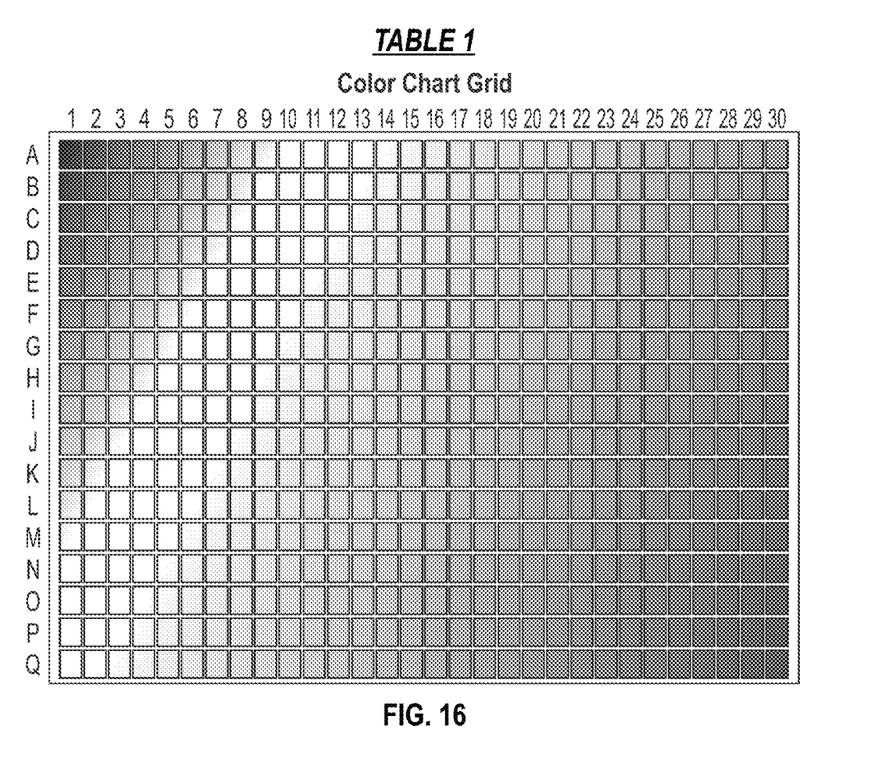

Referring again to FIG. 12, the interactive reification program may be configured to present one or more emotion-to-color tables to a reification technician on display module 1206, and to prompt the technician to identify an emotion to be displayed, and to select a corresponding color to represent the emotion. Any suitable table, graph, chart, histogram, or guide may be used as an emotion-to-color table. Table 1 (See FIG. 16) and Table 2 (below) represent non-limiting examples, where Table 1 may depict any color gradient from the upper left to lower right, such as Red Orange Yellow Green Blue Indigo Violet, and Table 2 may comprise any suitable arrangement of colors corresponding to associated emotions:

TABLE 2

| LIGHTER | Red | DARKER |
|---|---|---|
| Willing to share with others, Open to Love, Idealistic, Excitement | Creative ideas, Magical, Passion, Desires, High Emotions | Secretive, Controlling, Selfish, Hidden agendas, Anger, Out of control confusion, Selfish creations, Hurtful to others |
| Logical creations, Active thought | Red/Orange Gambler, Risk taker, Speculator | Self-destructive, Depression |
| Respected, Trusted, Kind hearted, Certainty | Orange Capable, Ownership, OK, Contentment with status quo Mental creations, Experienced Detailed oriented | Boastful, Judgmental, Superiority complex Possessed by random thoughts, May start hurtful rumors |
| Purposeful directed thought, Mental excitement | Yellow/Orange Active thought, Higher creations | Questioning, Self-destructive mental thought Apprehension, Doubt |
| Willing to give advice if asked, Impressive, Intellect, Mentally sharp, | Yellow Intelligence, Self-aware, Observer, Understanding | Too self important, May appear to be better than Can be intelligent snob, Tendencies to be self-sacrificing, May become religious fanatic |
| Heal by love & compassion | Yellow/Green Intellectual healer, | Question abilities/doubt, |
| Lots of Friends, Healer, See life as opportunity, Helpful, Abundant | Green Healing, Growth, Wellness, Wealth, Abundance | May have health issues, Uncertain healing abilities, And yet boastful of abilities Secretive, Selfish, Jealous, Envy, Greed |
| Contentment, Balance health, | Blue/Green Balanced success, Acceptance, | Out of Balance, Indifference, |
| High standards, Inner happiness, Calm, Peaceful, Shares personal experiences | Blue Spiritual, Peaceful, Calmness, Contentment, Experiences | Judgmental, Discounts others experiences, May like to appear superior, Likes to advise others unasked, Withdrawal from outer world |
| Balanced purpose, | Blue/Purple/Violet Learning process, | Not understanding, Rejection, |
| Wisdom from experiences, Stable, Peaceful, Logical, Reasonable | Purple/Violet Wisdom, Intellect, Insightful, Knowledge from experience | Reclusive, judgmental, Expects the worst, May become mentally unstable |
| Psychic, Writer, Philosopher, Otherworldly | Purple/Violet/Red Imagination, Illusion, Visions, Mystical | Has dark side, Fearful Negative perspectives, Secretive, Addictive behavior, |
| Enjoys life & companionship Active, Athletic, Works out physically | Earthy Brown Physically oriented, Has drama, Loves nature | Psychotic, Emotional ups & downs, Disturbed by dramas |
| Reaches out openly, Friendly to all, Love to connect with others | White/Silver Expanding, Touching, Connecting, Reaching out | Hidden agendas, May wish to control others Illusions of grandeur Can be out of touch with normal realty |
| Loves everybody & everything Helps others freely, Open to relationships | Pink Love, Caring, Compassion, Romantic | Possessive in relationship Conditional love, Defensive Controlling in relationships, Desires the spotlight |

Figure 15:
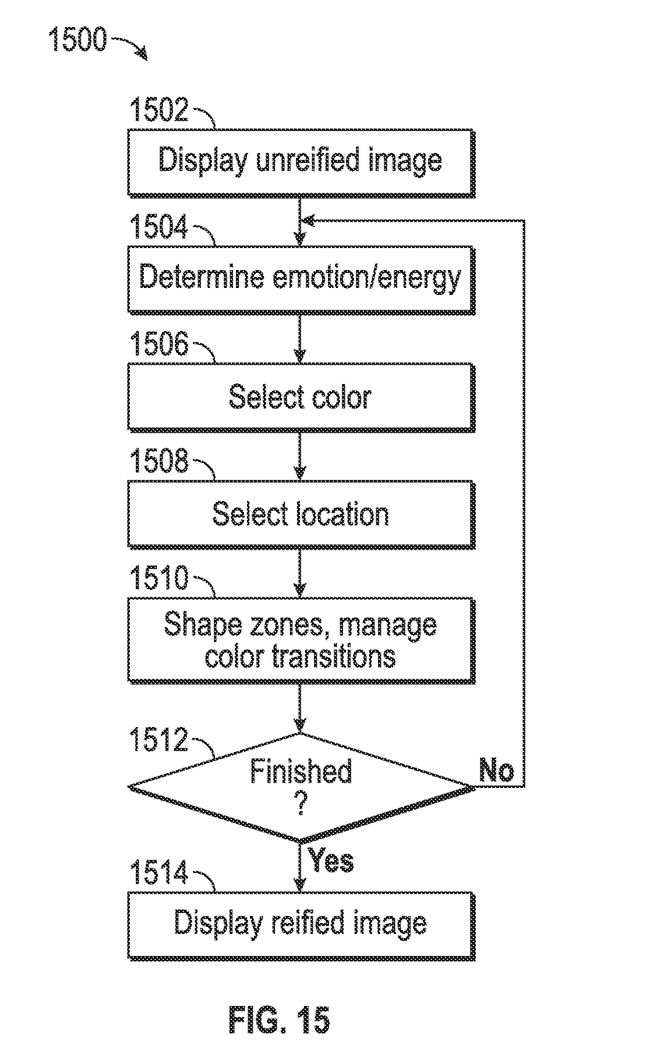
FIG. 15 is a schematic flow diagram of a process for reifying images in accordance with various embodiments and FIG. 16 is a table, referred to herein as Table 1, depicting a color chart grid.

FIG. 15 is a schematic flow diagram of an exemplary method 1500 for reifying images in accordance with various embodiments. More particularly, the method 1500 includes displaying (Task 1502) an unreified image. In addition, the interactive reification program can provide contextual information, such as director's notes, script, or any other data to describe the emotion(s) sought to be reified. The technician then determines (Task 1504) which emotion(s) to display. Once the emotion has been identified, a corresponding color or colors are selected (Task 1506), for example, based on a color/emotion chart 1222. The technician may also be prompted to select (Task 1508) one or more locations on the image at which the colors are to be displayed. Having selected the color and location, the interactive reification program may then prompt (Task 1510) the technician to massage or refine the shape, position, and extent of the displayed color, and to otherwise manage various properties of the colors (hue, intensity, shade, texture, lightness/darkness), as well as the transitions between colors.

The interactive reification program may also be configured to prompt (Task 1512) the technician to repeat tasks 1504-1510 as desired to accommodate any number of colors and any number of desired location, depending on the complexity of the image being reified. The reified image may then be displayed (Task 1514).

An interactive computer program is thus provided for augmenting an image to include reified emotion information. The computer program, when executed by a computer processor, is configured to implement the steps of: displaying an unreified image; prompting a user to identify an emotion associated with the image; prompting the user to select a color corresponding to the identified emotion; prompting the user to select a location within the image for applying the selected color; applying the selected color to the selected location within the image; and displaying the reified image.

In various embodiments, the image may comprise a still photograph, a series of video frames, or the like.

In an embodiment, prompting a user to identify an emotion comprises displaying textual information associated with the image.

In an embodiment, prompting the user to select a color comprises displaying an emotion-to-color matrix.

In an embodiment, prompting the user to select a location comprises displaying a body map.

In an embodiment, displaying the reified image comprises displaying the unreified image with the selected color superimposed onto the selected location within the image.

In an embodiment, the emotion-to-color matrix comprises a plurality of emotions, each having at least one color associated therewith.

In an embodiment, the emotion-to-color matrix comprises a plurality of colors, each having at least one emotion associated therewith.

In an embodiment, the emotion-to-color matrix comprises a plurality of emotions and corresponding colors, including lighter and darker versions of the colors to denote variations of the associated emotion.

In an embodiment, the image comprises a human being, and the location comprises a zone surrounding the human being.

In an embodiment, the image comprises a human being, and the location comprises a zone associated with a body part.

In an embodiment, the image comprises two human beings, and the location comprises a zone surrounding the two human beings.

In an embodiment, the image comprises two human beings, and the location comprises a zone substantially between the two human beings.

In an embodiment, the image comprises a non-human living being, and the location comprises a zone surrounding the non-human living being.

In an embodiment, the image comprises an inanimate object, and the location comprises a zone surrounding the inanimate object.

In an embodiment, the interactive computer program may be further configured to implement the step of prompting the user to refine the shape of the selected location.

In an embodiment, the interactive computer program may be further configured to implement the steps of: prompting the user to select a second emotion, color, and location; and displaying the reified image further including the second emotion, color, and location.

A system for reifying images is also provided, the system comprising: an input/output module for facilitating user interaction with the system; a display module for displaying unreified and reified images; a memory module for storing unreified images, reified images, a color/emotion matrix, and a location map; and a processing module including an image editor and an interactive reification module. The interactive reification module may be configured to perform the steps of: displaying an unreified image; prompting a user to identify an emotion associated with the image; prompting the user to select a color corresponding to the identified emotion; prompting the user to select a location within the image for applying the selected color; applying the selected color to the selected location within the image; and displaying the reified image.

Finally, a method of reifying an image is provided, the method comprising: identifying an emotion associated with an image; selecting a color associated with the emotion; selecting a location within the image at which the color is to be displayed; and displaying the reified image including the selected color at the selected location.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

The invention claimed is:

1. An interactive computer program stored in a non-transitory medium for augmenting an image including an object to include reified emotion information associated with the object, the computer program, when executed by a computer processor having access to a computer memory, configured to implement the steps of:
   displaying an unreified image comprising an object for viewing by a user;
   prompting the user to identify an emotion associated with the object within the image;
   retrieving, using the computer processor, an emotion-to-color matrix from the computer memory;
   displaying the matrix to the user;

prompting the user to select, from the matrix, a color corresponding to the identified emotion;

prompting the user to select a location associated with the object for applying the selected color;

superimposing, using the computer processor, the selected color onto the selected location;

converting, using the computer processor, the unreified image to a reified image which illustrates the selected color superimposed onto the selected location; and displaying the reified image for viewing by the user.

2. The interactive computer program of claim 1, wherein the image comprises a still photograph.

3. The interactive computer program of claim 1, wherein the image comprises at least one video frame.

4. The interactive computer program of claim 1, wherein the emotion-to-color matrix comprises a plurality of emotions corresponding to a plurality of discrete colors, and further wherein superimposing comprises superimposing a single one of the plurality of colors onto the selected location.

5. The interactive computer program of claim 4, wherein the selected location corresponds to the shape of the object in the image.

6. The interactive computer program of claim 1, wherein prompting the user to select a location comprises displaying a human body map.

7. The interactive computer program of claim 1, wherein displaying the reified image comprises displaying the unreified image with the selected color superimposed onto the selected location surrounding the object.

8. The interactive computer program of claim 7, wherein the selected location comprises a zone surrounding an outline of the object.

9. The interactive computer program of claim 8, wherein the selected location comprises a portion of the object.

10. The interactive computer program of claim 9, wherein the emotion-to-color matrix comprises a plurality of emotions and corresponding colors, including lighter and darker versions of the colors to denote degrees of the associated emotion.

11. The interactive computer program of claim 1, wherein the image comprises a human being, and the location comprises a zone surrounding at least a portion of the human being.

12. The interactive computer program of claim 1, wherein the image comprises a human being, and the location comprises a zone associated with a human body part.

13. The interactive computer program of claim 1, wherein the image comprises two human beings, and the location comprises a zone surrounding at least a portion of the two human beings.

14. The interactive computer program of claim 1, wherein the image comprises two human beings, and the location comprises a zone substantially between the two human beings.

15. The interactive computer program of claim 1, wherein the image comprises a non-human living being, and the location comprises a zone surrounding at least a portion of the non-human living being.

16. The interactive computer program of claim 1, wherein the image comprises an inanimate object, and the location comprises a zone surrounding the inanimate object.

17. The interactive computer program of claim 1, further configured to implement the step of:

refining the shape of the selected location in response to user input.

18. The interactive computer program of claim 1, further configured to implement the steps of:

prompting the user to select a second emotion, a second color, and a second location; and displaying the reified image further including the second color superimposed onto the second location.

19. A system for reifying images, comprising:

an input/output module for facilitating user interaction with the system;

a display module for displaying unreified and reified images;

a memory module for storing unreified images comprising an object against a background, reified images, a color table, and a location map; and a processing module including an image editor and an interactive reification module configured to perform the steps of:

displaying an unreified image including its associated object;

prompting a user to identify an emotion associated with the object within the image;

retrieving the color table from the memory module;

displaying the color table;

prompting the user to select, from the color table, a color corresponding to the identified emotion;

prompting the user to select a location relative to the object for applying the selected color;

superimposing the selected color over the selected location within the image; and displaying the reified image including the color superimposed onto the selected location relative to the object.

20. A method for reifying an image including an object implemented by a computer program stored in a non-transitory medium and executed by a computer processor having access to a computer memory, the method comprising:

identifying an emotion associated with the object in the image;

retrieving an emotion-to-color map from the computer memory;

displaying the emotion-to-color map;

selecting, from the emotion-to-color map, a color associated with the identified emotion;

selecting a location within the image at which the color is to be displayed;

reifying, using the computer processor, the image to include the selected color superimposed over the selected location; and displaying the reified image including the selected color at the selected location.

* * * * *